July 4, 1933.  H. HUEBER ET AL  1,917,193
VACUUM STABILIZER
Filed June 23, 1930
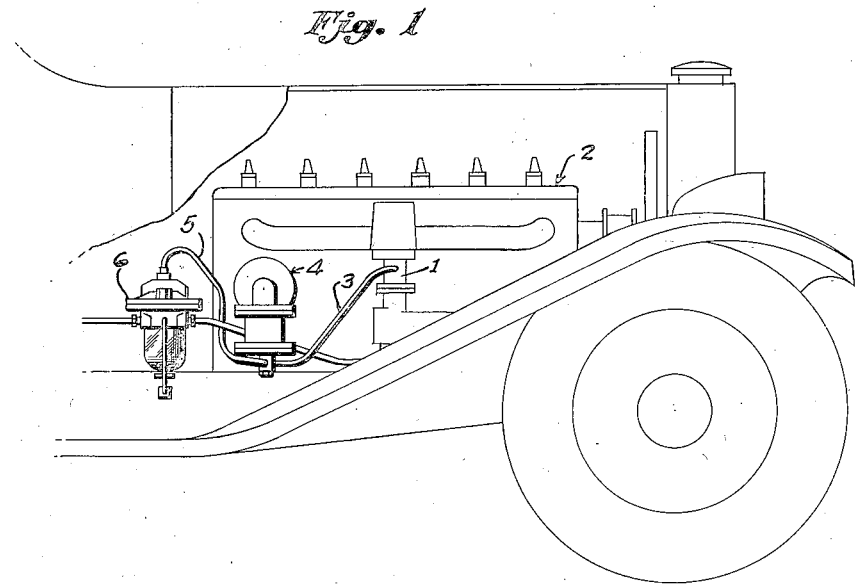
Fig. 1
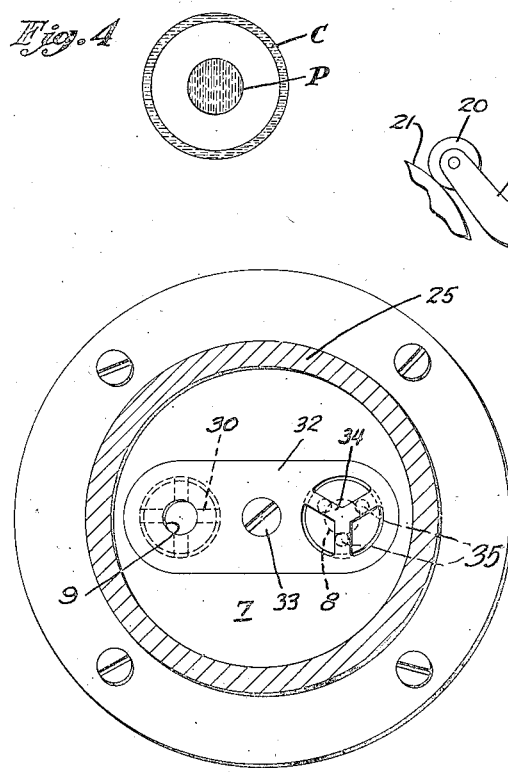
Fig. 4
Fig. 3
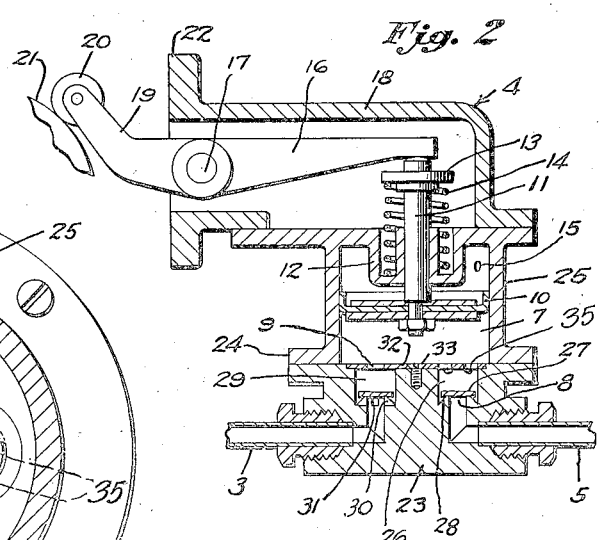
Fig. 2
Inventors
Henry Hueber &
Erwin C. Horton
By Barton A. Bean Jr.
Attorney Patented July 4, 1933                            1,917,193

UNITED STATES PATENT OFFICE

HENRY HUEBER, OF BUFFALO, AND ERWIN C. HORTON, OF HAMBURG, NEW YORK, ASSIGNORS TO TRICO PRODUCTS CORPORATION, OF BUFFALO, NEW YORK

VACUUM STABILIZER

Application filed June 23, 1930. Serial No. 463,282.

This invention relates to a mechanism for vitalizing the vacuum obtained from the intake manifold of an internal combustion engine for the purpose of operating vehicle accessories or adjuncts.

It has been found desirable to actuate automobile accessories, such as windshield wipers, fuel feed pumps, oil pumps, and other motor adjuncts, by utilizing the difference in pressure between atmospheric pressure and the pressure obtaining in the intake manifold of an internal combustion engine, that is, a sub-atmospheric pressure, for performing the work necessary to drive these accessories and adjuncts. While it has been found highly desirable to use such motive power, certain operating conditions found in present day use of automotive vehicles, that is, rapid acceleration and sustained high operating speed, decrease the difference in pressure between that obtaining in the intake manifold and atmospheric pressure to a degree where the vacuum obtaining within the manifold needs activation or revivification for the moment so that a continued and uniform vacuum be provided for motive power.

Certain valving devices have been used heretofore which have depended for their valving action upon the movement of ball valves to and from their seat or upon the action of spring controlled tappet valves. Where rapid and instantaneous response is required the movement of the balls has been found to be somewhat sluggish while certain inherent defects of tappet valves have mitigated against their use. The provision of a valve having a quicker and more responsive action is a desideratum which is highly desirable.

In our copending application, Serial No. 395,443, filed September 26, 1929, of which this may be considered a continuation in part, we disclosed a suction pump for use in stabilizing the vacuum from the intake manifold of an automotive engine, which vacuum was used as motive power for certain types of automobile accessories, such as a windshield wiper.

The object of the present invention is to provide a positively driven air pump with a valve action which will act efficiently under a high speed of operation and will insure of the inlet and outlet valves opening and closing in immediate response to the fluid pulsations and movements. The invention further provides a disc valving mechanism for the pump which is freely operable and which seats under the influence of the fluid flow and which is designed to move freely to and from its seating position without producing an adherent fluid film between the valve and the valve seat.

In the drawing,—

Fig. 1 is a fragmentary view showing the improved device attached to a fluid pressure line connecting a fuel pump to the intake manifold of the engine of an automotive vehicle.

Fig. 2 is a vertical cross-sectional view of the suction pump with a fragmentary view of the positive driving mechanism.

Fig. 3 is a section along the line 3—3 of Fig. 2.

Fig. 4 is a representation depicting the relative areas of the fluid ports, of the valving discs, and the valve chamber.

Referring more in detail to the drawing, the intake manifold 1 of the internal combustion engine 2 has a fluid pressure line 3 connected to the intake manifold and leading therefrom to the vacuum vitalizer or stabilizing device 4, with which it is connected and to which it provides fluid communication from the intake manifold 1. Another fluid pressure line 5 leads from the vacuum stabilizer to a motor adjunct 6, such as a fuel feeding device. Thus, the accessory 6 is connected to the manifold through the chamber 7 of the auxiliary suction producer 4; fluid passing through this chamber, entering from the conduit 5 and leaving by the conduit 3, through suitable fluid entrance and exit ports 8 and 9 respectively.

A piston 10 is operable in the chamber 7 and has its rod 11 slidably guided through the head member 12 of the chamber 7, a collar member 13 being carried by its outer end between which and the head 12 a spring 14 is compressed to function so as to urge the piston upwardly toward the upper limit of travel. The breather hole 15 permits of fluid communication with the atmosphere above the piston. The upper end of the piston rod 11 has contacting engagement with the work arm 16 which is attached at its fulcrum 17 to the interior wall of the housing member 18, this housing member being connected to the head portion 12 of chamber 5 and protecting the work arm 16. The lever arm 19 carries a follower member 20 attached thereto which makes contact with a camming portion 21 of the engine. The pumping member 10 is preferably of the sliding piston type, as shown, but obviously the diaphragm or other style of pumping member could be used without departing from the spirit of the invention and therefore the term "piston" will be used herein broadly to include the diaphragm type of pumping member.

A flanged portion 22 of the housing 18 is provided for attachment to a convenient portion of the engine, such as the crank case. A base portion or head 23 is removably attached to the flanged portion 24 of the cylinder 25.

A plurality of valve chambers are formed in the base portion. One of these chambers 26 contains a disc valve 27 movable in the chamber and seating on the inlet port 8. The bottom of the valve chamber 26 extends downwardly from the opening of the port as at 28, towards the sides of the valve chamber and thereby form a well defined valve seat. Another valve chamber 29 has fluid communication with the conduit 3 through the bottom of the chamber. A plurality of upstanding projections 30 in the bottom of the valve chamber provide a support for the disc valve 31 contained therein, and yet permits free and unimpeded flow of fluid through the passages 31 formed between the projections. A plate 32 is removably attached to the base portion 23, as by the screw 33 and the outlet port 9 is formed in the plate 32. Formed in this plate is a spider 34 extending over the valve chamber to prevent displacement of the valve disc, and on the underside are small projections or teats 35 extending downwardly into the valving chamber to prevent co-planar contact between the valve and the spider and the valve from adhering thereto through accumulating grease or oil.

The valve discs are preferably non-metallic; a fiber composition possessing lightness so as to enable the valves to "float" in response to the air movements or pulsations.

In the special arrangement of valves and valve chambers described herein, the entrance and exit openings to and from the valve chambers are placed at opposite ends of the chamber and are substantially axial thereof. The disc valves contained within the chambers are actuated by the fluid passing therethrough which fluid raises and supports the disc against the plate member 32 or holds these discs in the lower portion of the valve chambers away from the plate, depending upon the fluid pressure contained within the intake manifold of the engine, and upon the movement of the piston 10. When the suction in the manifold is of sufficient value, the piston 10 is in the depressed position and the flow of fluid against the underside of the disc 27 provides a propelling force whereby the said disc is held off its seat and even against the teats upon the underside of the spider 34; the valve disc 31 being in the depressed position and resting upon the projections 30 permitting free passage of air through the openings 31.

The clearance between the walls of each valve chamber and its valve disc itself is approximately equal in area to the port in the respective valve seat, and therefore the disc which is light in weight, will quickly respond to each air pulsation. Upon the up stroke of the piston 10 fluid will pass from the conduit 5, float the disc 27 in a position intermediate of the plate 32 and the seat port, or even hold the disc against the teats 35 on the spider 34 and still allow passage of air into the chamber 7. As the piston begins its descendency, however, the restricted valve clearance will cause the air or fluid to act upon the disc more in the nature of a fluid link column so as to immediately seat the disc. The restricted clearance and the lightness of the valve will render the disc immediately responsive to the air flow or pulsation.

The seat port in the plate 32 is likewise proportioned and the valve clearance in the outlet valve chamber will effect a like responsiveness of the disc 31, so as to close the seat port 30 in the valve chamber on the up stroke of the piston 10. Upon the down stroke of the piston, this disc rests upon the raised supporting members 30 in the bottom of the valve chamber and permits air or other fluid to pass between the clearance provided between this disc and the walls of the valve chamber, which clearance is approximately equal in area to the area of the opening of the outlet port leading to the conduit 3.

In the normal operation of the engine with manifold suction or vacuum of a desired degree, the piston will be held down out of the path of lever 16 and fluid will be allowed to flow continuously through the conduit 5 and the valve chamber 26, into the chamber 7 and from thence through the valve chamber 27 and conduit 3, while with insufficient manifold suction the piston is moved upward by the coil spring with consequent contacting engagement with the reciprocating lever arm 16 whereby enhanced fluid flow into and from the chamber 7 is induced.

Now as the piston reciprocates and the columns of air in the two valve chambers are pulsated, the restricted clearances around the sides of the disc valves, equal only to the areas of the seat ports will afford a broad flat surface on each disc for the column of air to act upon. This together with the air friction, as the air flows between the periphery of the disc and the surrounding chamber wall, insures an immediate responsive movement of the disc to the fluid pulsation. Consequently, the valves will open and close with each reciprocation and return stroke of the piston when the pump is operating at a high speed, as when the motor vehicle engine is operating at a high acceleration.

The valve chambers are preferably round in cross section, as are also the valve discs. Fig. 4 schematically represents the clearance and port areas wherein P designates the cross sectional area of the valve seat port and C denotes the clearance area between the periphery of the valve disc and the surrounding wall of the valve chamber. These two areas are approximately equal. The valve chambers provide well defined guides for the discs in which the rapidly pulsating and moving fluid columns actuate the valves with substantially equal rapidity to and from their seats.

What is claimed is:

1. An air pump for interposition in the suction line of motor vehicle accessories having a cylinder and a piston therein, inlet and outlet valve chambers for said pump, an orificed plate covering said chambers, ports to said chambers, projections extending downwardly from said plate into said inlet chamber, projections extending upwardly into said outlet chamber, and floatable disc valves movable between the ports and said projections in said chambers in response to fluid pulsations therein.

2. A booster pump for interposition in the suction line between an automobile accessory and the intake manifold of the motor vehicle engine, comprising, in combination, the accessory, the intake manifold and the connecting suction line, a casing having an inlet port connected to the accessory and an outlet port connected to the intake manifold, each port being provided with a valve chamber and an air floatable valve disc in the chamber movable to and from a port-closing position and having clearance with respect to the surrounding chamber wall substantially equal to the area of valve opening, the area of valve opening being substantially equal to the area of the suction line whereby when the manifold suction is sufficient in itself to operate the accessory a uniform movement of the air column between the accessory and the manifold is effected through the suction line and said ports and past said valves, and fluid displacing means operable in the casing to supplement the manifold suction when the latter is insufficient in itself to operate the accessory.

HENRY HUEBER.
ERWIN C. HORTON.